INVENTORS
Joseph M. Momchilov
Charles V. Staller
BY Bacon & Thomas
ATTORNEYS

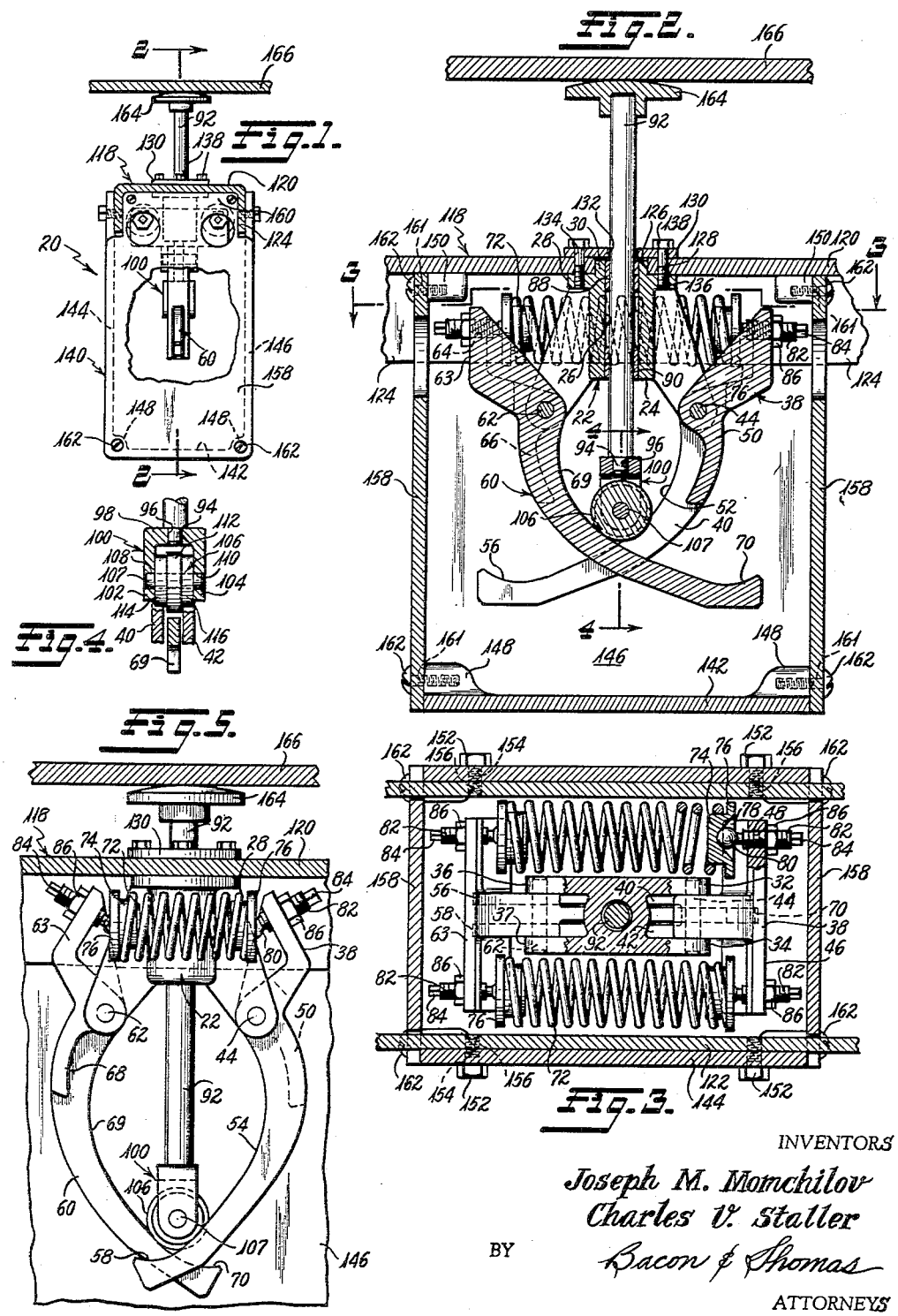

May 3, 1960 J. M. MOMCHILOV ET AL 2,935,313
SPRING SUSPENSION MEANS
Filed May 10, 1957 5 Sheets-Sheet 3

INVENTORS
Joseph M. Momchilov
BY Charles V. Staller
Bacon & Thomas
ATTORNEYS

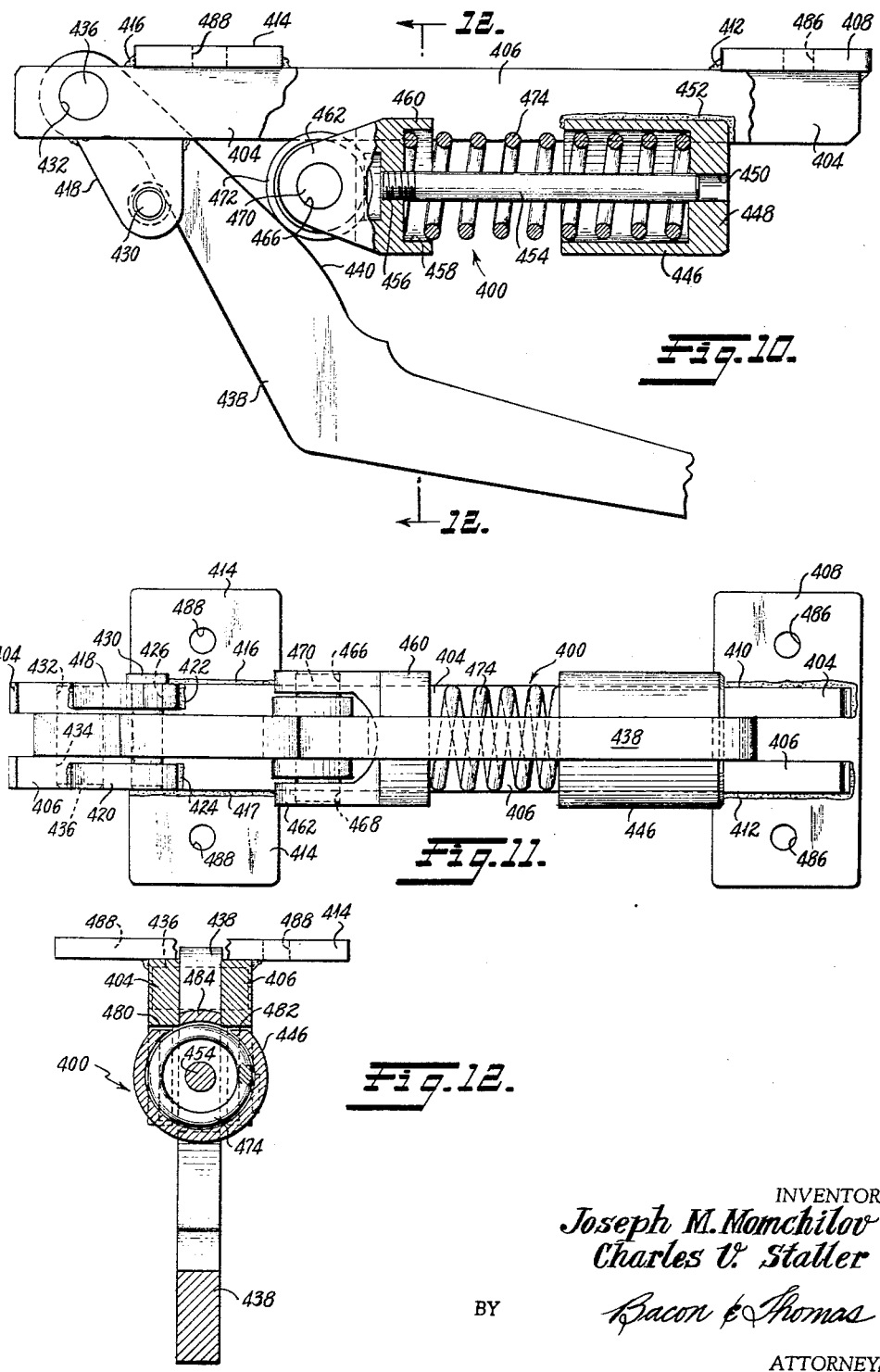

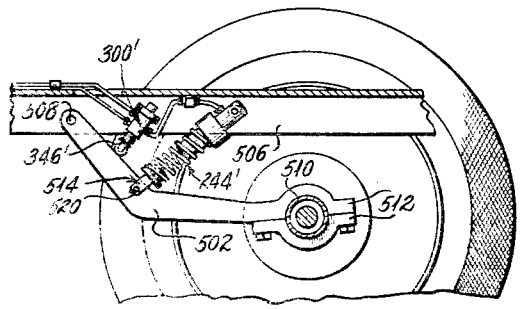
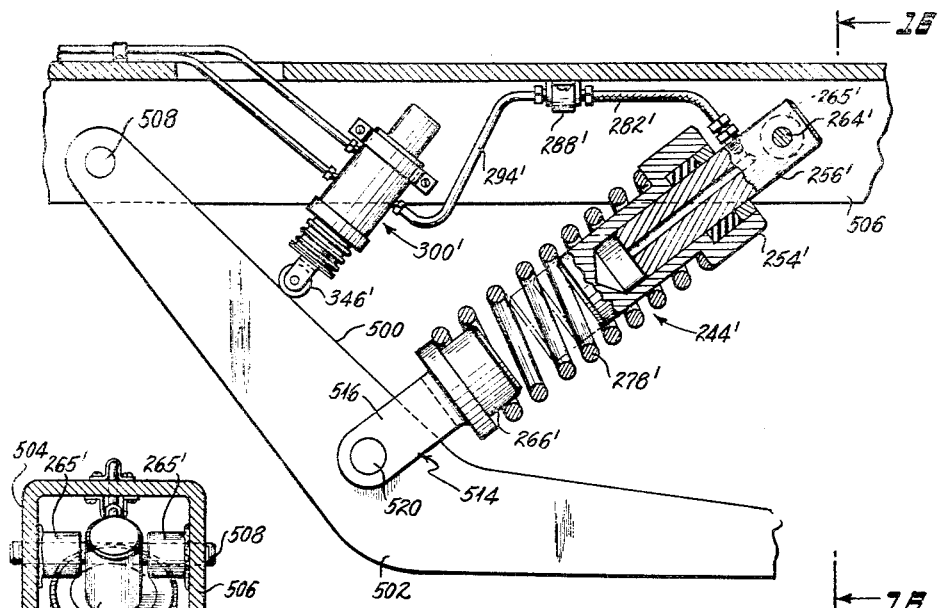
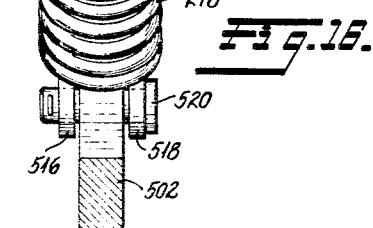

United States Patent Office 2,935,313
Patented May 3, 1960

2,935,313
SPRING SUSPENSION MEANS

Joseph M. Momchilov, Barberton, Ohio, and
Charles V. Staller, Bethel, Conn.

Application May 10, 1957, Serial No. 658,416

5 Claims. (Cl. 267—20)

This invention relates to suspension devices, and more specifically, the invention pertains to means especially designed for connection between a load-carrying member and a load-supporting member. To this end, the present invention contemplates the provision of unique resilient spring suspension means for maintaining the load-carrying member substantially constantly level.

As a primary object, this invention proposes the provision of cam means in conjunction with resilient means to maintain the afore mentioned load-supporting member substantially level under constant load conditions over a wide range of deflections of the load-carrying member relative to the load-supporting member.

A further object of this invention is to provide automatically controlled vehicle suspension systems for regulating the effective working range of a non-linear suspension system in accordance with the vehicle load.

A still further object of this invention is to provide in wheel-supported land vehicles a resilient suspension device automatically controlled by a hydraulic system which is rendered operable as increased load is delivered to any one or all of the wheels of the vehicle.

Other and further objects of this invention will become more evident from a consideration of the following specification when read in conjunction with the annexed drawings, in which:

Fig. 1 is an end elevational view of one embodiment of a spring suspension device or system constructed in accordance with the teachings of the present invention;

Fig. 2 is an enlarged longitudinal cross-sectional view of the device in Fig. 1 shown under normal load conditions, the view being taken on the vertical plane of line 2—2 of Fig. 1, looking in the direction of the arrows;

Fig. 3 is a transverse cross-sectional view, partly in elevation and partly broken away for the purpose of clarity, the view being taken on the horizontal plane of line 3—3 of Fig. 2, looking in the direction of the arrows;

Fig. 4 is a fragmentary detail cross-sectional view taken on the vertical plane of line 4—4 of Fig. 2, looking in the direction of the arrows;

Fig. 5 is a side elevational view of the device at maximum deflection;

Fig. 9 is an enlarged fragmentary elevational view, partly in cross-section, taken on the horizontal plane of line 9—9 of Fig. 6, looking in the direction of the arrows;

Fig. 10 is an enlarged side elevational view of a third embodiment of this invention, partially in cross-section and partially broken away to illustrate the component elements thereof;

Fig. 11 is a bottom plan view of the suspension device illustrated in Fig. 10;

Fig. 12 is a detail cross-sectional view taken on the vertical plane of line 12—12 of Fig. 10, looking in the direction of the arrows;

Fig. 14 illustrates the spring suspension device illustrated in Figs. 6 and 7 as utilized in the rear end of a vehicle;

Fig. 15 is an enlarged side elevational view, partly in cross-section, of the rear suspension device shown in Fig. 14; and Fig. 16 is a fragmentary detail cross-sectional view, taken on the vertical plane of line 16—16 of Fig. 15 looking in the direction of the arrows.

Figure 6:
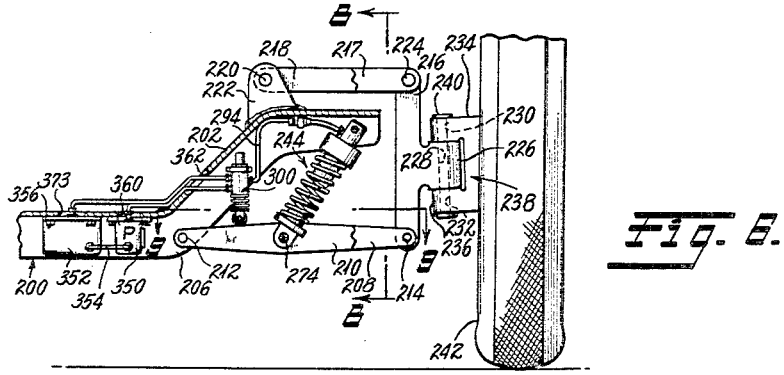
Fig. 6 is a front elevational view of a spring suspension device for the front wheels of a land vehicle, the suspension device being constructed in accordance with a second embodiment of the instant invention.

Referring now more specifically to Figs. 1 to 5, inclusive of the drawings, reference numeral 20 designates, in general, the first embodiment of a spring suspension device constructed in accordance with the teachings of the present invention. As illustrated in these figures, the device 20 is seen to comprise a suspension bracket 22 which includes an enlarged substantially cylindrical boss 24 having an axially extending cylindrical bore 26. The upper end of the boss 24 is formed with a laterally, outwardly extending radial flange 28 integrally formed therewith. The boss 24 terminates at its upper end and above the flange 28 in an integrally formed cylindrical neck 30 of reduced diameter.

A pair of integrally formed, downwardly extending, spaced and substantially parallel hanger arms 32, 34 are positioned on one side of the boss 24, and a similar pair of hanger arms 36, 37 are provided at the opposite side thereof. A bifurcated bell-crank lever 38 having arms 40, 42 is pivotally mounted on a pivot pin 44 which extends between and is supported on the hanger arms 32, 34. The upper end of the lever 38 terminates in an integrally formed cross-flange 46 having tapped bores 48 extending transversely therethrough adjacent the opposed ends thereof. A web 50 extends between the adjacent sides of the arms 32, 34 proximate the pivot pin 44 and serves as abutment means for a purpose to be described. The upper sides of the arms 32, 34 are provided with downwardly extending cam surfaces 52, 54 which, adjacent the lower free ends thereof, terminate in abruptly curved sections 56, 58 that function as stop means in a manner to be described in detail below.

A second bell-crank lever 60 is pivotally mounted on a pivot pin 62 that extends between and is supported on the hanger arms 36, 37. As is seen in the drawings, the bell-crank lever is so positioned as to pivot intermediate the arms 40, 42 of the bifurcated lever 38.

The second bell-crank lever 60, at its upper end, terminates in an integrally formed cross-flange 63 having a pair of tapped bores 64 extending transversely therethrough adjacent its opposed ends. Integrally formed flanges 66, 68 project laterally from opposite sides of the lever 60 and serve as abutment means for a purpose to be described. The upper side of the lever 60 is provided with a cam surface 69 having the same configuration as the cam surfaces 52, 54, and the lower free end thereof terminates in an abrupt curved section 70 of the same configuration as the sections 56, 58, and also serves as stop means for a purpose to be described in detail below.

A pair of elongated helicoidal springs 72 are disposed on opposite sides, respectively, of the hanger bracket 22. Each of the opposed ends of the springs 72 receives a keeper 74 and seat against its flange 76. The outer end of each keeper 74 is provided with a relatively shallow conical recess 78 which receives therein the enlarged spherical end 80 of an adjustment bolt 82 threaded through the tapped bores 48 and 64. The outer end of each adjustment bolt is provided with a wrench head 84 and a lock nut 86 to hold the bolt in adjusted position.

Cylindrical bushings 88, 90 are telescoped within the upper and lower ends, respectively, of the cylindrical bore 26. A cylindrical shaft 92 extends axially through the bushings and bore and is adapted for reciprocation with respect thereto. The lower end of the shaft 92 terminates in a projection 94 of reduced diameter which is press fitted or otherwise fixedly secured within an opening 96 formed in the bight portion 98 of a roller-supporting carriage 100. The carriage 100 comprises an inverted substantially U-shaped element having a pair of side walls 102, 104 disposed in spaced parallel relation and which depend from opposite ends of the bight 98.

A roller means or cam follower means 106 is disposed between the side walls 102, 104 and is mounted for rotation on an axle 107, the opposed ends of which are received within openings 108, 110 which extend transversely through the side walls 102, 104, respectively. The roller 106 has a circumferential central roller portion 112 of greater diameter than the diameters of the circumferential roller portions 114, 116 disposed on opposite sides thereof. As is seen in Figs. 2 and 5, the central portion 112 is normally disposed between the hanger arms 32, 34 and engages and follows the cam surface 69 of the lever 60, while the side portions 114 and 116 of the roller 106 ride on the cam surfaces 52, 54.

Reference numeral 118 designates, in general, a load supporting element having an inverted substantially U-shaped configuration including an elongated bight 120 from the sides of which depend spaced and substantially parallel side walls 122, 124. The bight 120 is provided with a circular opening 126 extending transversely therethrough and a plurality of bolt holes 128 disposed in radially spaced relation therearound.

To connect the above-described spring suspension device 20 to the load-supporting element 118, the upper end of the shaft 92 is passed upwardly through the opening 126 and the neck 30 is telescoped therethrough up to the point at which the radial flange 28 engages the underside of the bight 120.

An annular member or washer 130 has a central opening 132 which receives the upper end of the shaft 92 therethrough and rests on the upper surface of the bight 120. The annular member 130 is also formed with a plurality of radially spaced bolt receiving holes 134 which are adapted for alignment with the bolt holes 128, and both sets of bolt holes are aligned with tapped openings 136 formed in the flange 28. Bolts 138 project through the sets of bolt holes 128, 134 and are threaded in the tapped openings 136.

The spring suspension device 20 is provided with a housing designated by reference numeral 140, and is seen to comprise a substantially U-shaped channel member having an elongated bight 142 integrally connected at its sides with a pair of substantially rectangular, spaced and parallel side walls 144, 146. Elongated tapped bosses 148 are integrally formed with the housing 140 adjacent the four inner and lowermost corners thereof. The side walls 144, 146 are each provided with integral pairs of bosses 150 which are also internally threaded. The bosses 150 are disposed adjacent the marginal ends, respectively, of their associated wall and adjacent to but spaced below the upper end thereof.

As is seen in Figs. 1 and 3, the upper ends of the side walls 144, 146 of the housing 140 engage against the outer sides of the side walls 122, 124 of the load-supporting member 118. The housing 140 is connected thereto by bolts 152 which pass through openings 154 formed in the side walls 144, 146 and are threaded into the aligned internally threaded apertures 156 formed in the side walls 122, 124.

The opposed open ends of the housing 140 are each provided with a closure member 158 having a substantially rectangular configuration. The marginal edges of each of the closure members 158 are cut away at their respective upper corners to form a tongue 160 which fits snugly against the underside of the bight 120 and against the inner sides of the side walls 122, 124.

The closure members 158 are each provided with openings 161 adapted for alignment with the bosses 148, 150. Bolts 162 extend through the openings 161 and are threaded into the bosses 148, 150 to releasably secure the closure members to the housing.

The upper end of the shaft 92 may, optionally, be provided with a cap 164 to engage the underside of the load-carrying member 166.

In an example illustrating the utility of the above-described invention, the load supporting element 118 may comprise a part of a tractor frame on which the spring suspension device is mounted. The load carrying member 166, in this example, comprises the base of the tractor seat.

The shape of the cam surfaces 52, 54, 69 is designed to offset the rising spring characteristics and the springs 72 are preloaded to balance the operator's weight. As the tractor operator mounts the seat or load-carrying member 166, the deflection rises and the roller descends towards the position shown in Fig. 2.

Now, as the tractor is operated and moves over uneven ground, the varying load causes the roller 106 to ride up and down the cam surfaces 52, 54, 69 (extreme positions shown in Figs. 2 and 5) with constant load deflection characteristics. In other words, the load is balanced in any position.

In the event of a sudden increase of load the roller 106 may tend to pass below its position as shown in Fig. 5 and ride off the cam surfaces 52, 54, 69. This would permit the cap 164 to strike the washer or annular member 130 and impart a shock. To prevent this from occurring, the curved sections 56, 58, 70 are so designed that as the roller 106 descends into engagement therewith the sections are positioned substantially at right angles to the axis of the shaft 92 thereby serving as stop means preventing further downward movement of the roller 106.

In this embodiment of the invention, the webs 50 and 66 serve to limit the pivotal movement of the levers 40, 60 in an upward direction.

Figures 6 to 9, inclusive, illustrate another embodiment of this invention as applied to the front or forward end of an automotive or other similar vehicle. In these figures, reference numeral 200 designates a conventional front cross-frame member comprising a part of the vehicle chassis which supports a vehicle body (not shown).

The cross-frame member 200 has an inverted substantially U-shaped transverse cross-sectional configuration including a bight portion 202 from the sides of which depend a pair of spaced and substantially parallel side flanges 204, 206.

A pair of conventional A frame levers 208, 210 have one of their respective ends pivotally connected on a pivot pin 212 which extends between and is supported on the flanges 204, 206. The other ends of the levers 208, 210 are pivotally connected by pivot pin 214 to the lower end of a substantially vertically disposed shaft 216 on diametrically opposed sides thereof. Similar levers 217, 218 have one of their respective ends pivotally connected on pivot pin 220 to an enlarged boss 222 fixedly secured to the cross-brace 209 adjacent an end thereof. The other ends of the levers 217, 218 are pivotally connected by pivot pin 224 to the upper end of the shaft 216 on diametrically opposed sides thereof.

A boss 226 is integrally formed with, and projects laterally from, the shaft 216 and is provided with a vertically extending central bore 228 which is aligned with bores 230, 232 formed in the hanger arms 234, 236 of a conventional stub axle bracket 238. Pivot pin 240 connects the hanger arms 234, 236 to the boss 226. The stub axle bracket mounts the wheel 242 in the conventional manner.

Reference numeral 244 designates, in general, a spring suspension device constructed in accordance with this invention. This device is seen to comprise an elongated cylindrical casing 246 having a cylindrical bore 248 (see Fig. 7) closed at its lower end 250. The upper end of the casing is outwardly offset to provide a shoulder 252 and an upper annular flange 254, the internal diameter of which is greater than the diameter of the bore 248.

A cylindrical support element 256 is telescoped for reciprocation within the casing 246 and the upper end thereof projects beyond the upper end of the flange 254. Packing rings 255 are disposed between the flange 254 and the support element 256. The element 256 is provided with an internal axial passage 258 which extends inwardly from the lower end thereof and terminates at a point proximate its upper end. At this point the passage 258 intersects the inner end of a radially extending passage 260.

Figure 7:
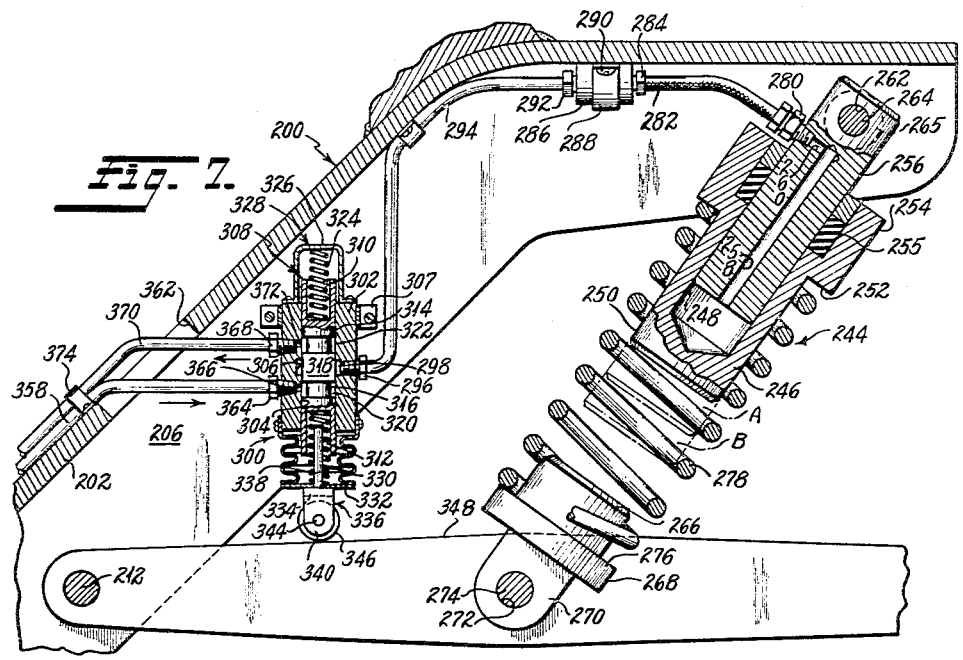
Fig. 7 is an enlarged detail longitudinal cross-sectional view of the resilient suspension device shown in Fig. 6.
Figure 8:
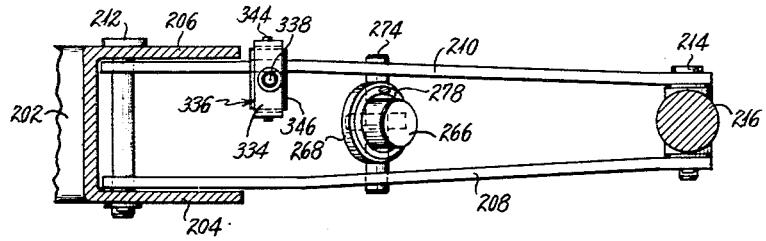
Fig. 8 is an enlarged fragmentary end elevational view, partly in section, and taken on the vertical plane of line 8—8 of Fig. 6, looking in the direction of the arrows.

The upper end of the support element 256 is provided with a diametrically extending bore 262 disposed at a 90° angle with respect to the passage 260. As is seen in Figs. 7 and 8, the upper end of the support member 256 is disposed between the flanges 204, 206. The support member 256 is pivotally connected to the flanges 204, 206 by means of a pivot pin 264 which is received through the bore 262 and which extends between and is supported on the aforementioned flanges. Spacers 265 are carried on the pin 264 intermediate the upper end.

The lower end of the spring suspension device 244 includes a circular boss 266 having an enlarged radial flange 268 and a depending tongue 270 apertured at 272. The aperture 272 receives therethrough a pivot pin 274 which extends between and is supported on the levers 208, 210. The flange 268 provides a shoulder 276 which confronts the shoulder 252, and intermediate these shoulders is interposed a helicoidal spring 278, the ends of which abut thereagainst. As is seen in the drawings, the spring 278 surrounds the casing 246 and the boss 266, and the adjacent ends of the casing and boss are positioned in spaced confronting relation.

A fitting 280 is threaded into the outer end of the radial passage 260 and connects one end of a flexible conduit 282 therewith. The other end of the conduit 282 connects through a second fitting 284 with one end of a fluid connector 286 which is rigidly mounted on the bight 202 by a clamp 288 and bolts 290. A fitting 292 connects one end of conduit 294 with the connector 286, and the other end of the conduit 294 is connected through the fitting 296 with the port 298 of a spool type valve 300.

The spool type valve 300 includes a substantially hollow cylindrical housing 302 having an axial bore 304 extending therethrough. A circular groove 306 is cut in the housing 302 intermediate the ends thereof and communicates with the port 298. Lugs 307, integrally formed with the housing 302, are welded or otherwise rigidly connected with the cross-frame member 200.

Reference numeral 308 designates the valve body which is seen to comprise an elongated cylindrical element having an inwardly extending axial recess 310 at one of its ends and a similar recess 312 at the opposite end thereof. The valve body 308 is necked down at 314, 316 to form the valve proper 318 which normally seats across the circular groove 306 and creates fluid inlet and outlet chambers 320, 322 on opposite sides thereof.

One end of a helicoidal spring 324 is seated in the recess 310 while the other end thereof abuts against the closure wall 326 of a cap 328 fixedly secured to the upper end of the valve body 308.

A helicoidal spring 330 has one of its ends seated within the recess 312 while the other end thereof abuts against a circular plate 332, the latter being rigidly secured to the bight 334 of a roller mounting 336. A shaft 338 has one of its ends fixedly secured to the bight 334, and the other end thereof projects upwardly through the plate 332 and extends partially into the recess 312.

Spring 330 surrounds the shaft, and a flexible bellows element has one of its ends secured to the lower end of the housing 302 and the other end extends downwardly therefrom for connection with the plate 332. Bellows are shown as encircling the lower ends of the spring 330 and shaft 338 to prevent accumulation of dirt and grit thereon.

A pair of oppositely disposed flanges 340, 342 depend from opposite sides of the bight 334 and support therebetween opposite ends of an axle 344 on which is mounted a roller 346. The roller 346 is adapted to follow the cam surface or contour 348 of the upper end of the lever 210.

Reference numeral 350 designates a hydraulic pump connected with a reservoir 352 through conduit 354. Any conventional fastening means such as bolts 356 may be used to connect the pump and reservoir to the cross-frame member 200.

A conduit 358 extends from the high-pressure or discharge side of the pump 350 and through openings 360 and 362 formed in the bight 202, and is connected by coupling 364 with the valve inlet port 366. The latter is in constant communication with the inlet chamber 320. A coupling 368 connects one end of a conduit 370 with the outlet port 372, the other end of the conduit 370 extends through the openings 360, 373, and is connected at its other end with the reservoir 352. One or more clamps 374 fixedly secure the conduits 358 and 370 to the bight 202.

Assuming that the elements described above are in their normal positions relative to each other as illustrated in Figs. 6 and 7, the operation of the device is as follows:

Pump driving means (not shown) are connected with the pump 350. The latter is of conventional design and is provided with an automatically operated fluid by-pass (not shown) which is utilized when no demand is made on the pump by the suspension device 200.

Now, let it be assumed that one or more passengers enter the vehicle body. The added weight causes the outer end of the levers 208, 210 and 217, 218 to pivot upwardly around their respective pivot pins 212, 220. Simultaneously, the roller 346 follows the rising cam surface 348 and moves upwardly. The valve 318 is also moved upward and is unseated from the shown position to place the fluid inlet chamber 320 into communication with port 298, whereby fluid under pressure flows through conduit 294, and passages 260, 258 into the casing 246. The fluid pressure now forces the casing 246 to move downwardly to positions A or B illustrated in dotted lines against the tension of the spring 278. Upon cessation of the movement of the levers 208, 210, 217, 218 the spring 278 acts on the lever 210 and its associated levers 208, 217, 218 to pivot them back to their original positions (as illustrated), and in so acting the roller 346 follows the descending surface 348 causing the valve 318 to seat across the port 298 to close the same from communication with the fluid inlet chamber 320. The casing 246, however, remains in its newly assumed position and will remain so as long as the number of passengers, the inclination of the road and other related factors remain constant.

Thus, from the foregoing discussion it is seen that the height of the car above the road is made constant independent of the load.

As the chassis is relieved of the weight of the passenger or passengers, the lever 210 moves downwardly around the pivot pin 212 and the valve 318 moves downwardly placing the discharge chamber 322 into communication with the port 298, whereby fluid is discharged from the casing 246 and passes through the passages 258, 260, conduits 282, 294, and 370 to the reservoir 352.

The helicoidal spring 330 serves to eliminate constant disturbances of the hydraulic system incurred through road bumps, and the viscous resistance offered by the hydraulic fluid prevents the valve body 308 from following rapidly every up and down movement of the lever 210. However, since the valve body floats freely between the springs 324, 330, it follows a medium of instantaneous positions of the lever 210, which corresponds to the constant load on the wheel.

A third embodiment of this invention is illustrated in Figs. 10 to 13, inclusive. In these figures, reference numeral 400 designates, in general, a spring suspension device for suspending the rear end of a chassis frame member 402. As illustrated, the suspension device 400 comprises a unit which includes a pair of elongated substantially rectangular side frame members 404, 406, disposed in spaced parallel relation relative to each other. A substantially rectangular end plate 408 extends across one adjacent pair of ends of the frame members 404, 406 and is welded at 410, 412 thereto. A similar end plate 414 is rigidly connected by welding 416, 417, to the frame members 404, 406, adjacent to but spaced inwardly from the other adjacent ends of the frame members. Lugs 418, 420 are welded at 422, 424 to the aforementioned other ends of the frame members 404, 406, respectively, and depend therefrom. The lugs 418, 420 are each provided with an aperture 426, the apertures being coaxially aligned. A stop pin 430 is received in the apertures 426.

Apertures 432, 434 are formed in the frame members 404, 406, respectively, and receive therein a pivot pin 436 on which is pivotally mounted one end of a lever 438 having a cam surface 440. The other end of the lever 438 extends rearwardly for fixed connection through the split clamp 442 with the rear axle housing 444.

Reference numeral 446 indicates a hollow cylindrical member having a closure wall 448 extending across one end thereof, the closure wall 448 having a centrally located transversely extending opening 450 formed therein and extending transversely therethrough. Welding 452 secures the cylindrical member 446 to the frame members 404, 406, adjacent the end plate 408 with the open end thereof facing the lever 438.

One end of a shaft 454 is mounted for reciprocation within the opening 450 and the other end projects outwardly from the cylindrical member 446 towards the lever 438. The other end of the shaft is threaded at 456 into the base 458 of a second cylindrical member 460. A pair of spaced substantially parallel flanges 462 are apertured at 466, 468, respectively, to receive therein an axle 470 on which is mounted a roller 472 which engages against the surface 440.

One end of a helicoidal spring 474 surrounds the shaft 454 and abuts against the base 458 of the cylindrical member 460, and the other end thereof engages the closure wall 448 of the cylindrical member 446. The spring 474 is under compression so that the roller 472 is constantly biased for movement toward the cam surface 440 of lever 438.

Referring now to Fig. 12, reference numerals 480, 482 designate a pair of radially spaced elongated cutouts formed in the cylindrical member 460. These cutouts receive the lower ends of the frame members 404, 406 which, when taken together with the arcuate section 484 disposed therebetween, serve as guide rails for the cylindrical member 460 as it reciprocates. These same elements also serve to prevent rotation of the shaft 454 about its axis and thus prevents the roller 472 from turning at an angle relative to the cam surface 440.

The above-described unit is adapted to be connected to the bight 485 by means of bolts (not shown) which extend through openings 486, 488 formed in the end plates 408, 414, respectively.

Figure 13:
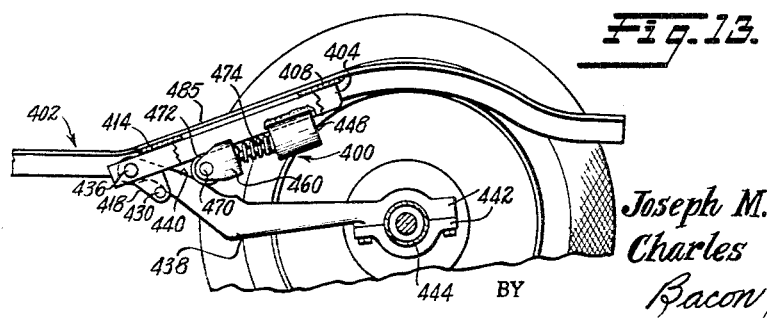
Fig. 13 illustrates an application of the spring suspension unit of Figs. 10 to 12, inclusive.
Figure 7:
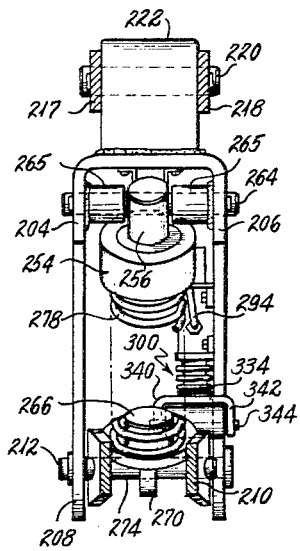

With the unit installed as illustrated in Fig. 13, the component elements thereof and their respective association relative to each other under normal conditions is shown in Fig. 10. Under such conditions the lever 438 abuts against the stop pin 430 and the cylindrical member 460 is moved to its farthest extended position away from the cylindrical member 446.

Now as one or more passengers enter the vehicle body supported on the chassis frame member 402 the lever 438 is pivoted upwardly causing the roller 472 to follow the raised portion of the cam surface 440 and to further compress the spring 474.

In operation, the roller 472 moves back and forth along the cam surface 440 and in so doing compresses the spring 474 in such a manner that approximately constant load is transmitted from the wheel to the chassis frame member 402.

It should be understood that this embodiment of the invention could be installed directly with a vehicle chassis frame member in which case the members 404, 406 correspond to the side flanges of the frame member.

Another application of this invention is illustrated in Figs. 14 to 16, inclusive. In these figures the hydraulic suspension system described above in connection with Figs. 6 to 9, inclusive, have been adapted to suspension of the chassis at the rear of the vehicle. In this embodiment, elements finding counterparts in the second embodiment are distinguished therefrom by the addition of a prime mark.

Thus, in this case the roller 346' follows the cam surface 500 formed on the upper end of the L-shaped lever 502. The lever 502 is pivotally connected to the flanges 504, 506 on the pivot pin 508. The other end of the lever 502 is connected to the rear axle housing 510 by means of the split clamp 512. In this instance, the boss 266' terminates in the bifurcated tongue 514 having spaced parallel bifurcated arms 516, 518 disposed on opposite sides of the lever 502. Pin 520 pivotally connects the tongue 514 with the lever 502.

In all other respects, the invention illustrated in Figs. 14 to 16, inclusive, is identical to the invention illustrated in Figs. 6 to 9, inclusive.

Having described and illustrated a number of embodiments of this invention, it will be understood that the same are offered merely by way of example, and that this invention is to be limited only by the scope of the appended claims.

We claim:
1. A spring suspension device, comprising: a hanger bracket having a central body portion; a pair of bell-crank levers pivotally mounted on opposite sides of said body portion, said levers having their lower portions in offset relation relative to each other and crossing at a point below said body portion; resilient means between said levers tending to move the lower portions thereof inwardly about the respective pivotal axes; and a shaft mounted for reciprocation in said body portion and having means at the lower end thereof engaging the upper edges of said levers adjacent the point at which they cross, the upper end of said shaft being adapted to bear a load tending to cause said shaft to move downwardly, said means at the lower end of said shaft thereby tending to move said upper edges of said levers outwardly against the action of said resilient means.

2. The device of claim 1 wherein said means at the lower end of said shaft includes roller means.

3. The device of claim 1 wherein said upper edges of said levers are formed to present a concave curved edge surface.

4. The device of claim 3 including stop means at the outermost ends of said edges.

5. A spring suspension device, comprising: a central body portion having a vertically extending bore formed therein; two pairs of hanger arms secured to said central body portion and extending downwardly and outwardly therefrom, said pairs of hanger arms being positioned on opposite sides of said body portion; a first bell-crank lever pivotally mounted intermediate its ends between one of said pairs of hanger arms; a second bell-crank lever pivotally mounted intermediate its ends between the other of said pairs of hanger arms, the lower portions of both of said levers extending downwardly and being curved inwardly and crossing each other at a point below said body portion, said first bell-crank lever having its lower portion bifurcated to receive said second bell-crank lever between the respective sections thereof; helical springs adjustably mounted between the opposed upper ends of said levers; a shaft mounted for reciprocation within said bore; roller means mounted at the lower end of said shaft and engaging the inner surfaces of said bell-crank levers adjacent the point at which they cross; means for securing said body portion to a load-supporting element; and means for supporting a load-bearing member at the top of said shaft, said load-bearing member tending to force said shaft downwardly and move the inner edges of said bell-crank levers outwardly against the action of said springs.

References Cited in the file of this patent

UNITED STATES PATENTS

| | | |
|---|---|---|
| 1,137,720 | Anderson | Apr. 27, 1915 |
| 1,469,788 | Hellenthal | Oct. 9, 1923 |
| 1,578,308 | Amedee-Mannheim | Mar. 30, 1926 |
| 2,213,822 | Minick | Sept. 3, 1940 |
| 2,687,311 | Nallinger | Aug. 24, 1954 |

FOREIGN PATENTS

| | | |
|---|---|---|
| 30,053 | France | Oct. 6, 1925 |

(2nd addition to No. 543,751)